(12) United States Patent
Hamada

(10) Patent No.: US 8,773,683 B2
(45) Date of Patent: Jul. 8, 2014

(54) IMAGE FORMING SYSTEM AND CONTROL METHOD THEREOF

(75) Inventor: Ryoh Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 86 days.

(21) Appl. No.: 13/470,447

(22) Filed: May 14, 2012

(65) Prior Publication Data

US 2012/0307283 A1 Dec. 6, 2012

(30) Foreign Application Priority Data

Jun. 3, 2011 (JP) ................. 2011-125359

(51) Int. Cl.
*G06K 15/00* (2006.01)
*G06F 3/12* (2006.01)
*G06F 7/04* (2006.01)
*G06F 17/30* (2006.01)

(52) U.S. Cl.
USPC ............. 358/1.14; 358/1.15; 726/2; 726/4; 726/7; 726/12; 726/17

(58) Field of Classification Search
None
See application file for complete search history.

(56) References Cited

U.S. PATENT DOCUMENTS

| | | | | |
|---|---|---|---|---|
| 8,305,604 | B2 * | 11/2012 | McIntyre | 358/1.15 |
| 8,437,021 | B2 * | 5/2013 | Yokoyama | 358/1.15 |
| 2002/0089688 | A1 * | 7/2002 | Ferlitsch et al. | 358/1.15 |
| 2002/0089692 | A1 * | 7/2002 | Ferlitsch | 358/1.15 |
| 2003/0079134 | A1 * | 4/2003 | Manchala et al. | 713/182 |
| 2004/0218213 | A1 * | 11/2004 | Shimizu et al. | 358/1.15 |
| 2006/0044593 | A1 * | 3/2006 | Kawakami et al. | 358/1.14 |
| 2009/0328159 | A1 * | 12/2009 | Luo | 726/4 |
| 2011/0145906 | A1 * | 6/2011 | Morita et al. | 726/7 |
| 2012/0307309 | A1 * | 12/2012 | Ikegaya et al. | 358/1.16 |

FOREIGN PATENT DOCUMENTS

| | | |
|---|---|---|
| JP | 2004-348366 A | 12/2004 |
| JP | 2010-109721 A | 5/2010 |

* cited by examiner

*Primary Examiner* — Satwant Singh

(74) *Attorney, Agent, or Firm* — Renner, Otto, Boisselle & Sklar, LLP

(57) ABSTRACT

When a user uses one of a plurality of image forming apparatuses from one of a plurality of terminals, an authentication server determines, on a user by user basis, whether he/she is permitted to use each image forming apparatus, and detects if any of the image forming apparatuses is in a troubled state and incapable of executing a prescribed function. If one image forming apparatus is in a troubled state and the user requests another, trouble-free image forming apparatus to execute a job utilizing a function of the trouble-free image forming apparatus, the authentication server permits execution of the job if the user is permitted to use the image forming apparatus in the troubled state. Thus, the user can get a print even if a usually used image forming apparatus is unavailable.

5 Claims, 9 Drawing Sheets

FIG.4

| DEVICE NO. | ADMINISTRATIVE RIGHT | FUNCTION | | | |
|---|---|---|---|---|---|
| | | COLOR PRINTER | MONO PRINTER | COLOR SCANNER | MONO SCANNER |
| D100 | G000 | G101 | G100 | G101 | G100 |
| D101 | G000 | G102 | G100 | G102 | G100 |
| D200 | G000 | G201 | G200 | G201 | G200 |
| D201 | G000 | G202 | G200 | G202 | G200 |
| ... | | ... | ... | ... | ... |

FIG.5

| AUTHORIZED GROUP | USER ID |
|---|---|
| G000 | U000001 |

| AUTHORIZED GROUP | USER ID |
|---|---|
| G100 | U000001 |
| | U000100 |
| | (U000101) |
| | U000102 |
| | U000103 |
| | U000104 |
| | U000105 |
| | (U000110) |
| | U000111 |
| | U000112 |
| | U000113 |
| | U000114 |
| | U000115 |

| AUTHORIZED GROUP | USER ID |
|---|---|
| G200 | U000001 |
| | U000200 |
| | U000201 |
| | U000202 |
| | U000203 |
| | U000204 |
| | U000205 |
| | U000210 |
| | U000211 |
| | U000212 |
| | U000213 |
| | U000214 |
| | U000215 |

| AUTHORIZED GROUP | USER ID |
|---|---|
| G101 | U000001 |
| | U000100 |
| | (U000101) |
| | U000102 |
| | U000103 |
| | U000104 |
| | U000105 |

| AUTHORIZED GROUP | USER ID |
|---|---|
| G201 | U000001 |
| | U000200 |
| | U000201 |
| | U000202 |
| | U000203 |
| | U000204 |
| | U000205 |

| AUTHORIZED GROUP | USER ID |
|---|---|
| G102 | U000001 |
| | (U000110) |
| | U000111 |
| | U000112 |
| | U000113 |
| | U000114 |
| | U000115 |

| AUTHORIZED GROUP | USER ID |
|---|---|
| G202 | U000001 |
| | U000210 |
| | U000211 |
| | U000212 |
| | U000213 |
| | U000214 |
| | U000215 |

IMAGE FORMING SYSTEM AND CONTROL METHOD THEREOF

CROSS-REFERENCE TO RELATED APPLICATION

This nonprovisional application claims priority under 35 U.S.C. §119(a) on Patent Application No. 2011-125359 filed in Japan on Jun. 3, 2011, the entire contents of which are hereby incorporated by reference.

BACKGROUND OF THE INVENTION

1. Field of the Invention

The present invention relates to an image forming system and control method thereof, solving a problem that a user cannot execute image formation (printing or the like) if an image forming apparatus of which use is permitted for the user should fail or be out of order.

2. Description of the Background Art

Recently, with better maintained network environment and wider use of personal computers (hereinafter also referred to as PCs), it has become possible to have electronic data such as documents and images printed anytime from anywhere.

Further, as one type of image processing apparatuses as electronic equipment, an image forming apparatus (typically a copy machine) for forming an image on a sheet of recording paper has been introduced to many places of business (companies and offices). In such a place of business, it is a common practice to have a plurality of image forming apparatuses having a printer function or copy function connected to a network and to share the apparatuses by a plurality of users. An MFP (MultiFunction Peripheral) as one type of such image forming apparatuses has a plurality of basic operational modes including a copy mode, a facsimile mode (hereinafter facsimile will be also denoted as FAX), a network compatible printer mode and a scanner mode.

In a network environment, by installing a plurality of print drivers for color and monochrome printing in a PC, it becomes possible to selectively use printers on a case-by-case basis. Even when jobs are accumulated on one printer, print instructions may be sent to other printers to enable highly efficient printing.

Other than when jobs are accumulated on one printer, sometimes the printer that is normally used is unavailable because of some malfunction or failure. In such a situation, it is necessary for the user himself/herself to change the printer to be used, and such switching is troublesome. As a solution to avoid such a trouble, Japanese Patent Laying-Open No. 2004-348366 (hereinafter referred to as '366 Reference) proposes a method of automatically outputting to another printer if the printer usually used by the user is unusable for printing because of failure or other reason. According to this method, by setting beforehand priority of printers used for output, when a print request is issued, printers that can receive the print request can be determined in order from the one having the highest priority and the printer can be set automatically.

Use of image forming apparatuses may be permitted for users who constantly use PCs and image forming apparatuses by employing the method according to '366 Reference. Generally, however, for a temporary user (for example, a visitor from outside), it is a common practice to allow use of only a prescribed image forming apparatus of highest priority and not to permit use of other image forming apparatuses of lower priority.

Such a system, however, is inconvenient for use. For instance, assume that the image forming apparatus of which use is permitted for the temporary user fails and not usable. In such a situation, the temporary user cannot have even an urgent object printed. If printing is absolutely necessary, a system administrator must change system settings temporarily to allow the temporary user to use a different image forming apparatus to print, and after execution of printing, the administrator must return the settings to the original state.

SUMMARY OF THE INVENTION

In view of the problem described above, it is desirable to provide, where the use of image forming apparatuses is limited user by user and the image forming apparatus of which use is permitted to a specific user is unavailable because of failure or other reason, an image forming system and control method thereof that can execute printing designated by the user.

The present invention provides an image forming system including an authentication server, a terminal and a plurality of image forming apparatuses. The authentication server includes a determining unit determining, in response to a request by a user requesting use of the image forming apparatus from the terminal, whether or not the user is permitted to use the image forming apparatus on a user by user basis, and a detecting unit detecting that the image forming apparatus is in a troubled state and cannot execute a prescribed function. Where the detecting unit detects that at least one of the plurality of image forming apparatuses is in the troubled state, in response to a user requesting an image forming apparatus not in the troubled state to execute a job utilizing a function of the image forming apparatus from the terminal, the determining unit permits execution of the job, if it is determined that the user is permitted to use the image forming apparatus in the troubled state.

Preferably, the image forming apparatus transmits, in response to occurrence of a trouble in the image forming apparatus, apparatus identifying information for identifying the image forming apparatus and trouble identifying information for identifying a type of the occurred trouble to the authentication server. The detecting unit detects the image forming apparatus in the troubled state and a function unusable because of the trouble, where the authentication server receives the apparatus identifying information and the trouble identifying information. Where the detecting unit detects that at least one of the plurality of image forming apparatuses is in the troubled state, in response to a user requesting an image forming apparatus not in the troubled state to execute a job utilizing a function of the image forming apparatus from the terminal, the determining unit permits execution of the job, if it is determined that the function utilized by the job corresponds to the function identified by the detecting unit and that the user is permitted to use the function unusable because of the trouble of the image forming apparatus in the troubled state.

The present invention further provides a method of controlling an image forming system including an authentication server, a terminal and a plurality of image forming apparatuses. The control method includes the steps of; in response to a user requesting use of the image forming apparatus from the terminal, the authentication server determining whether or not the user is permitted to use the image forming apparatus on a user by user basis; the authentication server detecting the image forming apparatus being in a troubled state and incapable of executing a prescribed function; where at least one of the plurality of image forming apparatuses is in the troubled state, in response to a user requesting an image forming apparatus not in the troubled state to execute a job utilizing a function of the image forming apparatus from the terminal, the authentication server permitting execution of the job, if it is determined that the user is permitted to use the image forming apparatus in the troubled state.

Preferably, the control method further includes the steps of: the image forming apparatus transmitting, in response to occurrence of a trouble in the image forming apparatus, apparatus identifying information for identifying the image forming apparatus and trouble identifying information for identifying a type of the occurred trouble to the authentication server; the authentication server identifying the image forming apparatus in the troubled state and a function unusable because of the trouble, by receiving the apparatus identifying information and the trouble identifying information; and where at least one of the plurality of image forming apparatuses is in the troubled state, in response to a user requesting an image forming apparatus not in the troubled state to execute a job utilizing a function of the image forming apparatus from the terminal, the authentication server permitting execution of the job, if it is determined that the function utilized by the job corresponds to the identified unusable function and that the user is permitted to use the function unusable because of the trouble of the image forming apparatus in the troubled state.

According to the present invention, where the use of image forming apparatuses is limited user by user and the image forming apparatus of which use is permitted to a specific user is unavailable because of failure or other reason, the user can use an image forming apparatus that is not usually permitted for use. Therefore, he/she can get the print. The trouble that print is impossible in an urgent situation can be avoided.

When a trouble occurs in an image forming apparatus, the user who is permitted to use the apparatus can know that the image forming apparatus is unusable because of the trouble. Therefore, if it is made known to the users in advance that a different image forming apparatus is usable in case of such trouble, it is possible for the user to designate any other image forming apparatus and to designate execution of a desired function.

For a user not influenced by the trouble, or a user who is not permitted to use the image forming apparatus in which the trouble occurred, usual authentication is executed. Therefore, unnecessary alarm of the trouble can be avoided, without causing any inconvenience.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a table showing pieces of permission information related to image forming apparatuses stored in an authentication server of the image forming system in accordance with an embodiment of the present invention.

FIG. 5 is a table showing pieces of user information stored in the authentication server of the image forming system in accordance with an embodiment of the present invention.

DESCRIPTION OF THE PREFERRED EMBODIMENTS

Figure 1:
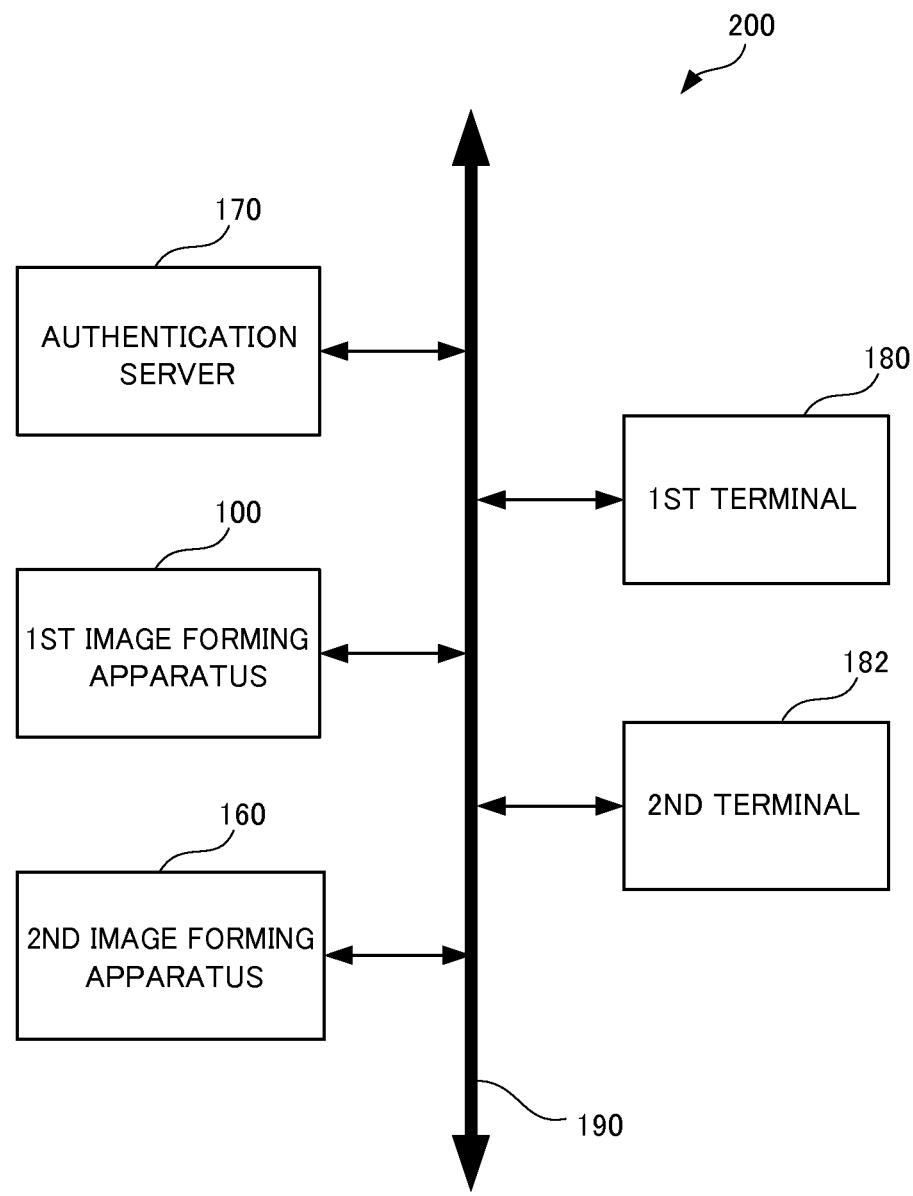
FIG. 1 is a block diagram showing a configuration of an image forming system in accordance with an embodiment of the present invention.

In the following embodiment, the same components are denoted by the same reference characters. Their names and functions are also the same. Therefore, detailed description thereof will not be repeated.

The image forming system in accordance with an embodiment of the present invention is implemented by a plurality of image forming apparatuses, a plurality of terminals and an authentication server computer (hereinafter referred to as "authentication server") connected to each other by a network. The image forming apparatus is a digital multifunction peripheral having a plurality of functions including the printer function, scanner function, copy function and facsimile function.

Referring to FIG. 1, an image forming system 200 in accordance with the present embodiment includes a first image forming apparatus 100, a second image forming apparatus 160, an authentication server 170, a first terminal 180, a second terminal 182 and a network 190 to which these components are connected. The first and second terminals 180 and 182 are, for example, computers. Authentication server 170 is a server that manages first and second image forming apparatuses 100 and 160 and first and second terminals 180 and 182. Authentication server 170 permits or inhibits the user to operate the first or second terminal 180 or 182 and thereby to form an image (print) by the first or second image forming apparatus 100 or 160.

Image forming system 200 may include other image forming apparatus or image forming apparatuses having similar functions, in addition to first and second image forming apparatuses 100 and 160. In FIG. 1, however, only two apparatuses are shown as representatives. Similarly, though image forming system 200 may include other terminal or terminals in addition to first and second terminals 180 and 182, only two are shown in FIG. 1 as representatives.

Figure 2:
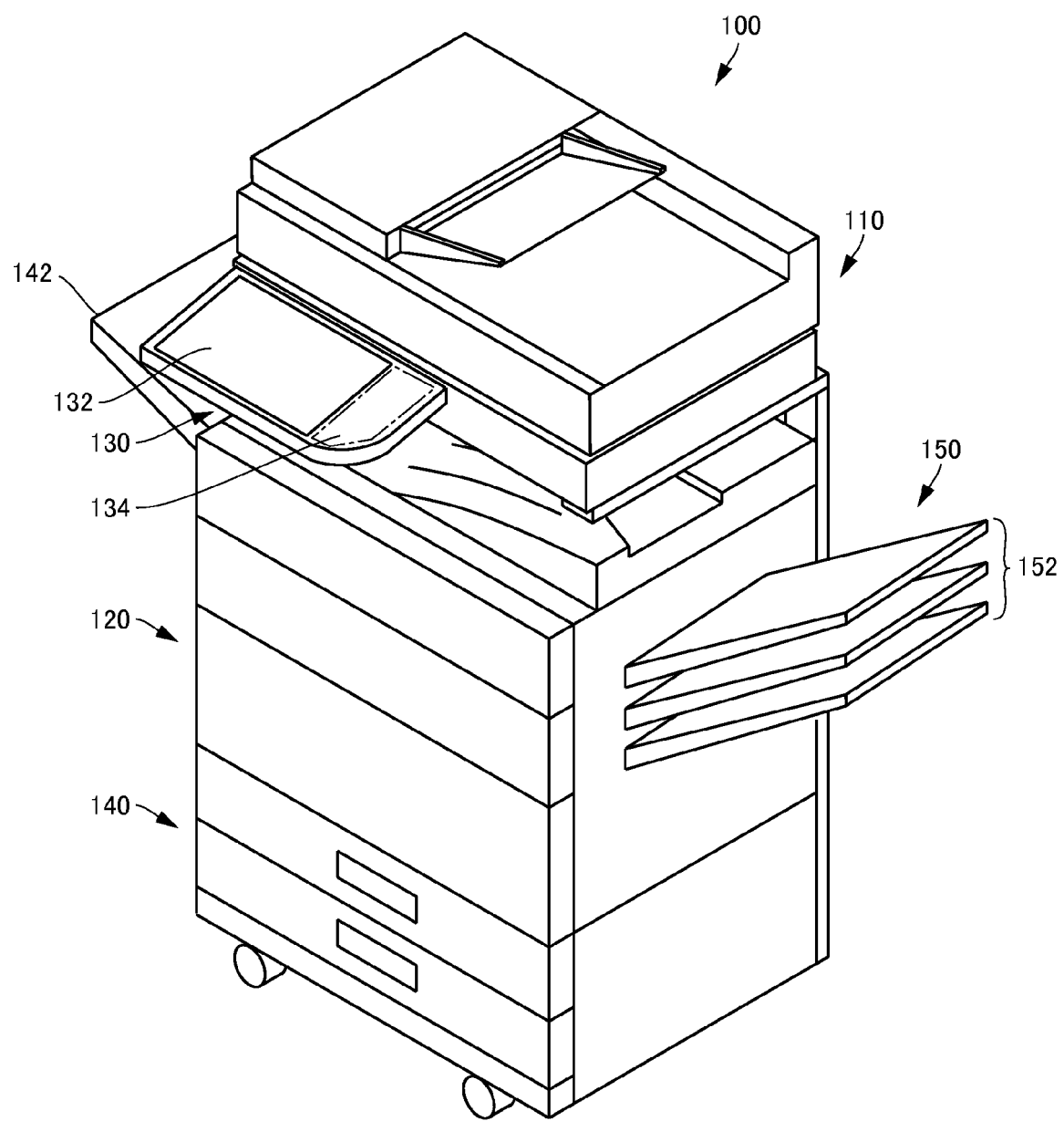
FIG. 2 is a perspective view showing an appearance of the image forming apparatus used in the image forming system in accordance with an embodiment of the present invention.

Referring to FIG. 2, image forming apparatus 100 includes a document reading unit 110, an image forming unit 120, an operation unit 130, a paper feed unit 140, a manual paper feed tray 142, and a paper discharge unit 150. Operation unit 130 includes a touch-panel display 132 and an operation key unit 134. Touch-panel display 132 includes a display panel implemented by a liquid crystal panel or the like, and a touch-panel arranged on the display panel and detecting a touched position. On operation key unit 134, a number of function keys, not shown, are arranged. It is assumed that the second image forming apparatus 160 has the same configuration as the first image forming apparatus 100. Therefore, the description of configuration and functions of the first image forming apparatus 100 in the following also applies to the second image forming apparatus 160.

Figure 3:
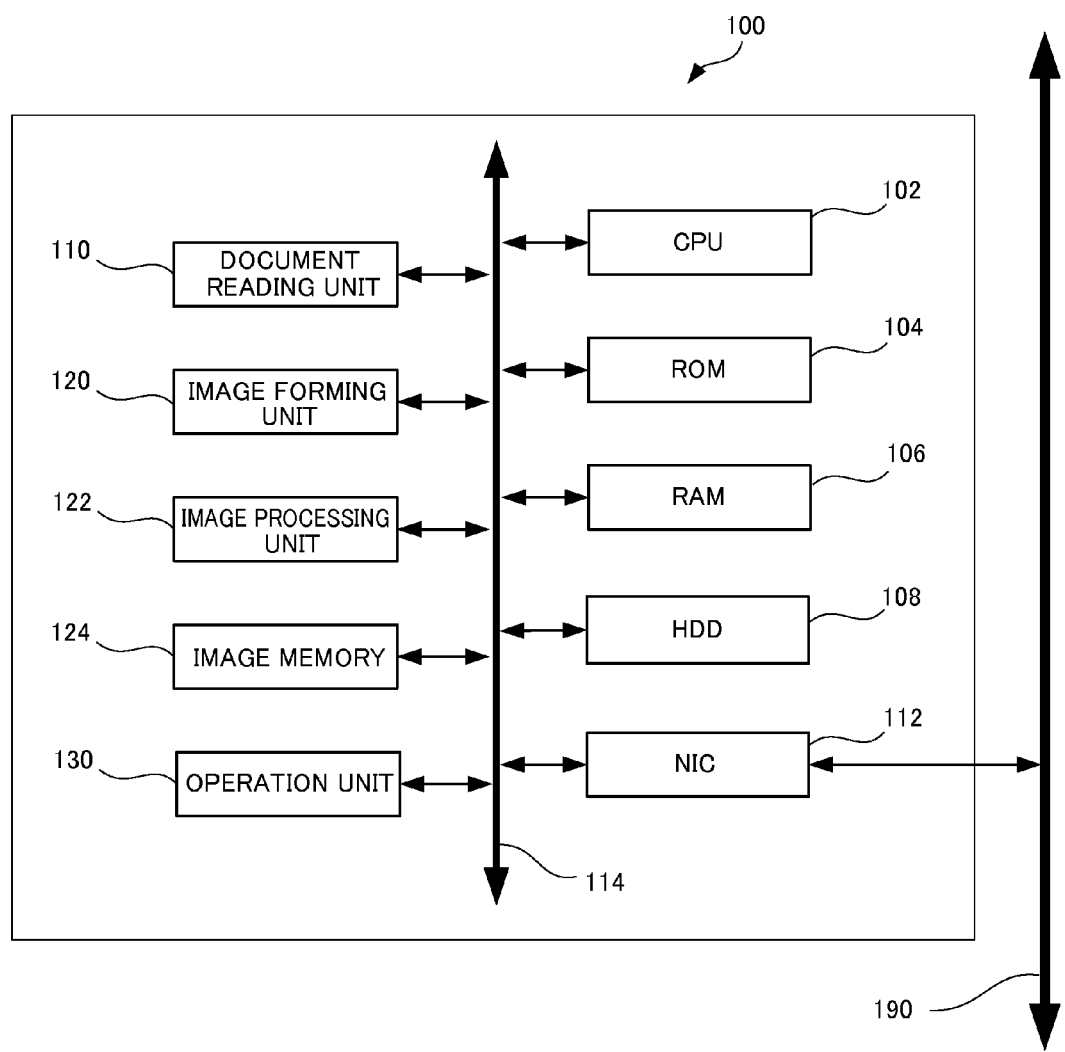
FIG. 3 is a block diagram showing an internal configuration of the image forming apparatus shown in FIG. 2.

Referring to FIG. 3, first image forming apparatus 100 includes: a control unit (hereinafter referred to as a CPU (Central Processing Unit)) 102 for overall control of image forming apparatus 100; an ROM (Read Only Memory) 104; an RAM (Random Access Memory) 106; and an HDD (Hard Disk Drive) 108. ROM 104 is a non-volatile storage device that retains data even when power is turned off. ROM 104 stores programs and data necessary for controlling operations of first image forming apparatus 100. RAM 106 is a volatile storage device. HDD 108 is a non-volatile storage device.

First image forming apparatus 100 further includes an image processing unit 122, an image memory 124, an NIC (Network Interface Card) 112 and a bus 114. CPU 102, ROM 104, RAM 106, HDD 108, NIC 112, document reading unit 110, image forming unit 120, image processing unit 122, image memory 124 and operation unit 130 are connected to bus 114. Data (including control information) are exchanged between each of these components and units through bus 114. CPU 102 reads a program from ROM 104 through bus 114 to RAM 106 and executes the program using a part of RAM 106 as a work area. Specifically, CPU 102 controls various components and units forming first image forming apparatus 100 and realizes each of the functions of first image forming apparatus 100 in accordance with a program or programs stored in ROM 104.

NIC 112 is connected to an external network 190, and it is an interface for first image forming apparatus 100 to communicate with an external device through network 190. First image forming apparatus 100 includes a FAX modem (not shown) as an interface for first image forming apparatus 100 to conduct FAX communication with an external device through a telephone line.

Document reading unit 110 includes a CCD (Charge Coupled Device) for reading an image, and a document detection sensor for detecting a document set on a platen or on an automatic document feeder (ADF). Document reading unit 110 reads the document and inputs image data. The image data is temporarily stored in image memory 124. Image processing unit 122 executes various image processing operations on the read image data. Image forming unit 120 prints image data on a sheet of recording paper. Image data is stored in HDD 108 as needed.

Paper feed unit 140 holds sheets of recording paper for forming images. Manual paper feed tray 142 is a tray for manually feeding sheets of recording paper.

Operation unit 130 receives inputs such as an instruction by the user to first image forming apparatus 100. The user confirms the state and job processing status of first image forming apparatus 100, from screen images displayed on touch-panel display 132. The user can set functions and instruct operations of first image forming apparatus 100 by selecting keys displayed on touch-panel display 132 on the touch-panel superposed on the display panel (by touching the corresponding portions on the touch-panel).

CPU 102 monitors the user operation on touch-panel display 132, input keys and the like provided on operation unit 130, and displays pieces of information to be notified to the user, such as the information on the state of first image forming apparatus 100, on touch-panel display 132.

Authentication server 170 includes a CPU, an RAM, an ROM, an HDD and an NIC, as does a general purpose computer.

In the following, each of the modes for executing the functions available on first image forming apparatus 100 (printer function, copy function, scanner function and facsimile function) will be briefly described.

(Printer Mode)

When first image forming apparatus 100 is used as a printer, image data received through NIC 112 is output from image forming unit 120 through image memory 124 and the like.

NIC 112 receives, for example, image data from first terminal 180 connected to network 190. The received data is transmitted page by page as output image data to image memory 124, and then stored in HDD 108. Thereafter, the image data stored in HDD 108 is successively read at appropriate timing and sent to image memory 124. Then, timed with image formation at image forming unit 120, the image data is transmitted to image forming unit 120.

At paper feed unit 140, a sheet of recording paper is drawn by a pick-up roller and conveyed by a plurality of conveyer rollers to image forming unit 120. At image forming unit 120, a charged photoreceptor drum is exposed in accordance with the input image data, whereby an electrostatic latent image corresponding to the image data is formed on a surface of photoreceptor drum. Toner is applied to the electrostatic latent image portions on the photoreceptor drum and, thereafter, the toner image is transferred to a sheet of recording paper. Thereafter, the sheet of recording paper is again heated and pressed (whereby the image is fixed on the sheet of paper), and then the sheet is discharged to paper discharge tray 152.

(Copy Mode)

When first image forming apparatus 100 is used as a copy machine, image data of the document read by document reading unit 110 is output as a copy from image forming unit 120.

By the CCD provided at document reading unit 110, images of the document set at a reading position can be electronically read. The read image data is completed as output data (print data) on image memory 124, and stored in HDD 108. If there is a plurality of documents, the reading and storage operations are repeated. Thereafter, based on the process mode instructed from operation unit 130, the image data stored in HDD 108 is successively read at appropriate timing and transmitted to image memory 124. Then, as in the print mode described above, the image data is transmitted to image forming unit 120 and image formation takes place.

When the read image is to be printed on a plurality of pages, the image data is stored page by page as output data in the similar manner in HDD 108, transmitted from HDD 108 to image memory 124, and transmitted to image forming unit 120 timed with image formation, repeatedly for the number of pages to be output.

(Scanner Mode)

When first image forming apparatus 100 is used, for example, as a network scanner, image data of the document read at document reading unit 110 is transmitted from NIC 112 through network 190 to a computer or the like (for example, first terminal 180). Here again, the document is electronically read by the CCD provided at document reading unit 110. The read image data is completed as output data on image memory 124, and stored in HDD 108. Thereafter, the image data is again transmitted from HDD 108 to image memory 124, and after communication with a transmission destination designated through operation unit 130 is established, transmitted from NIC 112 to the designated transmission destination.

(Facsimile Mode)

First image forming apparatus 100 can transmit/receive FAX to and from an external facsimile device through the FAX modem and telephone line.

When the first image forming apparatus 100 is used as a facsimile machine, data received by FAX from a facsimile machine is formed as image data on image memory 124, and in the similar manner as described above, storage in HDD 108 and printing by image forming unit 120 can be executed. Further, first image forming apparatus 100 can read image data from HDD 108, convert the data to a data format for FAX communication and transmit the converted data to an external facsimile machine through the FAX modem and the telephone line.

In the following, assuming that use of first and second image forming apparatuses 100 and 160 is limited user by user in image forming system 200, the function of temporarily canceling limitation of use if a trouble occurs in any of the image forming apparatuses will be specifically described.

It is assumed that authentication server 170 stores pieces of permission information and user information as shown in FIGS. 4 and 5, and that it manages use of the image forming apparatuses by the user based on these pieces of information. In FIG. 4, the device No. on the left end is a number for distinguishing image forming apparatuses from each other. Here, device Nos. D100 and D101 correspond to the first and second image forming apparatuses 100 and 160, respectively. Further, device Nos. D200 and D201 correspond to third and fourth image forming apparatuses (not shown in FIG. 1). The contents of a cell identified by the device No. and the function represent an authorized group (hereinafter also simply referred to as a group) permitted to use the corresponding function of the corresponding image forming apparatus. Contents of a cell in the column of administrative right of each device No. represent a group having the right to change the settings of the corresponding image forming apparatus. Each group shown in FIG. 4 consists of one or a plurality of users as shown, for example, in FIG. 5.

Referring to FIG. 4, the row of device No. D100 indicates that for first image forming apparatus 100 identified by device No. D100, administrative right is given to group G000, and groups G101, G100, G101 and G100 are permitted to use color printer function, monochrome printer function, color scanner function and monochrome scanner function, respectively. The row of device No. D101 indicates that for second image forming apparatus 160 identified by device No. D101, administrative right is given to group G000, and groups G102, G100, G102 and G100 are permitted to use color printer function, monochrome printer function, color scanner function and monochrome scanner function, respectively. Similarly, the rows of device Nos. D200 and D201 represent pieces of permission information related to the third and fourth image forming apparatuses.

From FIGS. 4 and 5, the following can be understood. In the following, a user other than the user set to have the administrative right (here, U000001) will be referred to as a general user.

Only the user U000001 has the administrative right for the first to fourth image forming apparatuses. User U000001 is a system administrator. General users of groups G101 and G102 (general users of group G100) are permitted to use the first and second image forming apparatuses 100 and 160. General users of groups G201 and G202 (general users of group G200) are inhibited to use the first and second image forming apparatuses 100 and 160. General users of groups G101 and G102 (general users of group G100) may use the monochrome printer function and the monochrome scanner function of first and second image forming apparatuses 100 and 160. Though general users of group G101 may use the color printer function and the color scanner function of first image forming apparatus 100, they cannot use the color printer function or the color scanner function of second image forming apparatus 160. Though general users of group G102 may use the color printer function and the color scanner function of second image forming apparatus 160, they cannot use the color printer function or the color scanner function of first image forming apparatus 100. Specifically, when monochrome-related functions are to be executed, the general users of groups G101 and G102 may use either the first or second image forming apparatus 100 or 160 at will, and when color-related functions are to be executed, they can use only the permitted one of the first and second image forming apparatuses 100 and 160.

The relations between the third and fourth image forming apparatuses and the general users of groups G201 and G202 are the same as above. Specifically, when monochrome-related functions are to be executed, the general users of groups G201 and G202 may use either of the third and fourth image forming apparatuses at will, and when color-related functions are to be executed, they can use only the permitted one of the third and fourth image forming apparatuses.

For instance, settings of FIGS. 4 and 5 may be made in the following situation. An organization consists of four departments. Departments corresponding to groups G101 and G102 are at a close distance (for example, both are on the same, first floor), and first and second image forming apparatuses 100 and 160 are installed in respective departments. Departments corresponding to groups G201 and G202 are at a close distance (for example, both are on the second floor, different from the first floor), and third and fourth image forming apparatuses are installed in respective departments. Specifically, regarding monochrome-related functions that are relatively frequently used and low cost, users of each group can arbitrarily use the image forming apparatuses on the same floor. On the other hand, regarding the color-related functions that are relatively less frequently used and high cost, the users of each group can use only a specific image forming apparatus. Settings shown in FIGS. 4 and 5 represent such a manner of operation.

On the premise that authentication server 170 manages the use of image forming apparatuses by the users in the above-described manner, the control structures of programs executed by each image forming apparatus and authentication server 170 in image forming system 200 will be described with reference to FIGS. 6 and 7.

Figure 6:
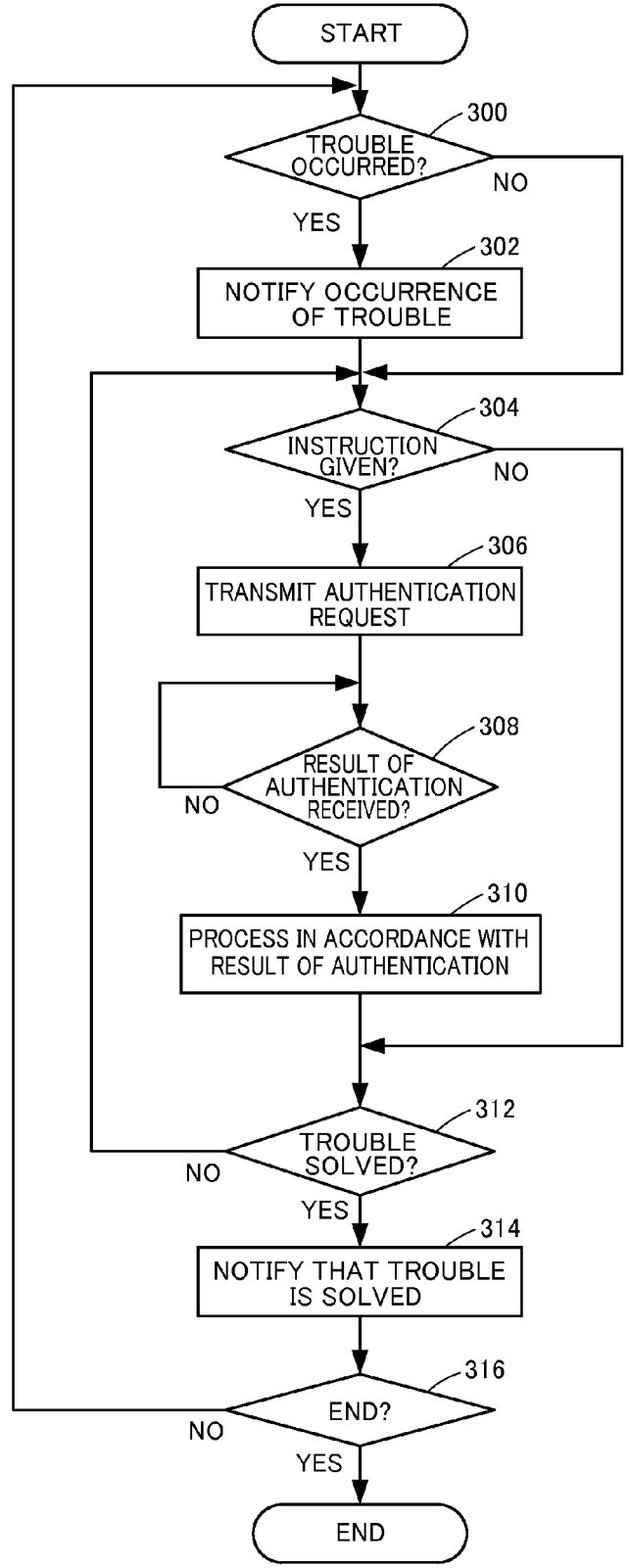
FIG. 6 is a flowchart representing a control structure of a program executed by the image forming apparatus of the image forming system in accordance with an embodiment of the present invention.

Referring to FIG. 6, at step 300 of the control structure of the program executed by first image forming apparatus 100, CPU 102 determines whether or not any trouble occurred in the first image forming apparatus 100 itself. The trouble refers to a state in which some or all of the functions of image forming apparatus cannot be used, and it includes not only a malfunction that needs fixing by a service person but also toner shortage and paper jam. If it is determined that a trouble has occurred, the process proceeds to step 302. Otherwise, the process proceeds to step 304.

At step 302, CPU 102 notifies authentication server 170 of the occurrence of trouble through NIC 112 and network 190. By way of example, CPU 102 transmits a prescribed code (trouble code) corresponding to the type of trouble and a piece of information (apparatus identifying information) for identifying the source of transmission (first image forming apparatus 100) as the information for identifying the trouble, to authentication server 170. Thus, authentication server 170 can identify what type of trouble has occurred in which image forming apparatus and which function is unavailable. By way of example, trouble codes may be determined in advance corresponding to a trouble in image forming unit 120, a trouble in document reading unit 110 and a trouble in paper feed unit 140, and the trouble codes may be stored in HDD 108. Then, CPU can read and transmit the trouble code corresponding to the occurred trouble from HDD 108. By storing the trouble codes and the corresponding unavailable functions in RAM or HDD of authentication server 170, it is possible for authentication server 170 to identify the unavailable function from the received trouble code. By way of example, when a trouble code corresponding to a trouble in image forming unit 120 is received, authentication server 170 can identify that the printer function, the copy function and the like are unavailable. Further, when a trouble code corresponding to a trouble in document reading unit 110 is received, authentication server 170 can identify that the copy function, scanner function and the like are unavailable. The types of troubles, that is, trouble codes, may be more finely classified.

At step 304, CPU 102 determines whether or not any instruction has been given. If it is determined that any instruction has been given, the process proceeds to step 306 and, otherwise, the process proceeds to step 312.

At step 306, CPU 102 transmits an authentication request to authentication server 170. By way of example, assume that the user operates the first terminal 180 and instructs the first image forming apparatus 100 to execute a specific function (for example, print function). Then, CPU 102 receives the instruction at step 304, and at step 306, inquires of authentication server 170 whether the instructed function may be executed in accordance with the user instruction.

More specifically, from first terminal 180 to first image forming apparatus 100, print data (image data and control data) and the user ID of the user are transmitted. The control data is data designating print conditions such as whether color printing or monochrome printing is to be done, size of recording paper, printing direction on recording paper and so on. Receiving the data, CPU 102 stores the contents as a job in HDD 108. Further, CPU 102 transmits the apparatus identifying information of first image forming apparatus 100, information identifying the function to be used by the user (function identifying information), user ID of the user and a code inquiring about permission/inhibition of printing (inquiry code) as authentication request, to authentication server 170. It is noted that even if the function instructed at step 304 is not executable because of the trouble, CPU 102 still transmits the authentication request. Further, if a document copy instruction or scan instruction is given by an operation of operation unit 130, the authentication request is transmitted in the similar manner.

At step 308, CPU 102 determines whether or not a result of authentication is received from authentication server 170. As will be described later, as the result of authentication, a permission code, an inhibition code, or a trouble-occurred notice is transmitted from authentication server 170. CPU 102 repeats step 308 until it receives the result of authentication, and when the result of authentication is received, the process proceeds to step 310.

At step 310, CPU 102 executes a process in accordance with the result of authentication. If the permission code is received at step 308, CPU 102 activates a program for executing the instructed process. By way of example, if a print instruction is issued from first or second terminal 180 or 182, a program for executing printing is activated, and printing is done in accordance with the program. If an instruction to copy a document or scan a document is issued by an operation of operation unit 130, similarly, the corresponding program is activated and the designated process is executed.

When the inhibition code is received at step 308, CPU 102 sends a message that the user is not permitted to execute the designated function, to the terminal from which the instruction has been received. The terminal displays the received message.

If the trouble-occurred notice is received at step 308, CPU 102 sends the received notice to the terminal from which the instruction has been received. Receiving the notice, the terminal displays the received trouble-occurred notice.

At step 312, CPU 102 determines whether or not the trouble has been solved. If it is determined that the trouble has not yet been solved, the process returns to step 304. If it is determined that the trouble has been solved, the process proceeds to step 314. For instance, if a service person fixes the trouble and presses a reset button, the CPU 102 can detect that the trouble has been solved.

At step 314, CPU 102 notifies authentication server 170 that the trouble has been solved, through NIC 112 and network 190. By way of example, CPU 102 transmits the trouble code, a code (clear code) indicating that the trouble has been solved, and apparatus identifying information to authentication server 170. Thus, authentication server 170 can identify which trouble in which image forming apparatus has been solved and which function or functions become available.

At step 316, CPU determines whether or not an instruction to end is given, and if not, the process returns to step 300.

Figure 7:
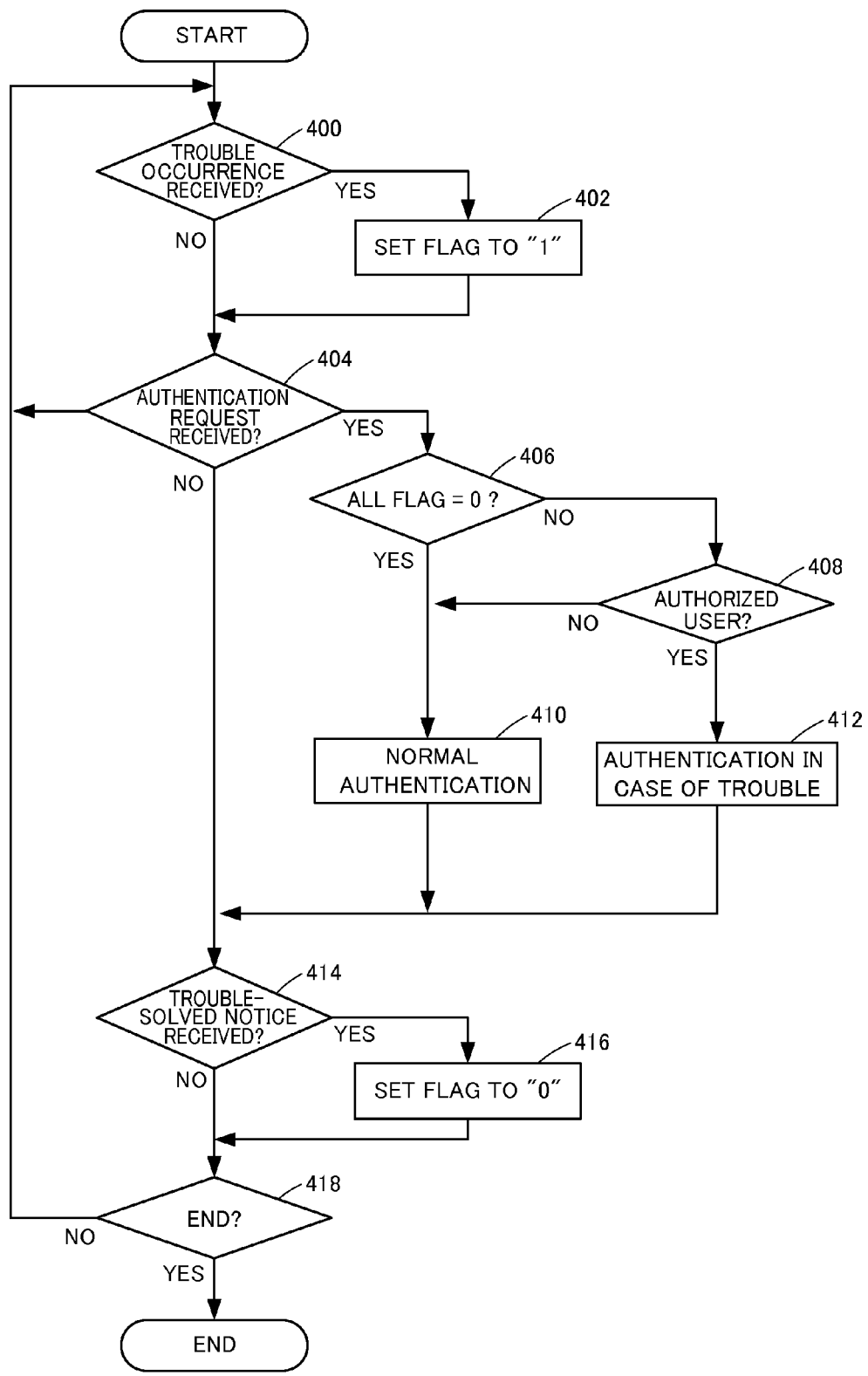
FIG. 7 is a flowchart representing a control structure of a program executed by the authentication server of the image forming system in accordance with an embodiment of the present invention.

Referring to FIG. 7, at step 400 of the control structure of the program executed by authentication server 170, authentication server 170 determines whether or not the trouble-occurred notice has been received. Specifically, it determines whether or not a trouble code and an apparatus identifying information (see step 302) transmitted from any image forming apparatus have been received. If it is determined that the notice has been received, the process proceeds to step 402, and otherwise, the process proceeds to step 404.

At step 402, authentication server 170 sets a flag identified by the apparatus identifying information and the trouble code received at step 400 to "1". It is assumed that when activated, authentication server 170 ensures a flag area for each trouble code in connection with each image forming apparatus as the object of management, in a prescribed area of the internal RAM. By way of example, each flag consists of 1 bit, and its initial value is, for example, "0" (corresponding to a trouble-free state).

At step 404, authentication server 170 determines whether or not an authentication request has been received. For instance, if the user operates first terminal 180 and instructs printing by first image forming apparatus 100, first image forming apparatus 100 inquires of authentication server 170 whether the print may be executed in accordance with the user instruction, and the authentication server receives the apparatus identifying information, the function identifying information, user ID and the inquiry code (see step 306). If it is determined that the authentication request has been received, the process proceeds to step 406. Otherwise, the process proceeds to step 414.

At step 406, authentication server 170 determines whether or not all flags are "0". If it is determined that all flags are "0", the process proceeds to step 410. If at least one flag is "1", the process proceeds to step 408.

At step 408, authentication server 170 determines whether or not the user of the user ID received at step 404 is a user permitted to use the image forming apparatus and the function having the trouble. Specifically, authentication server 170 identifies the cell corresponding to the device No. and the function of which flag is "1" from the stored table shown in FIG. 4, and obtains the authorized group. Authentication server 170 looks up at the table shown in FIG. 5, and determines whether or not the user IDs forming the identified authorized group includes the user ID received at step 404. If it is determined that the user ID is not included (if the user of the received user ID is not the authorized user), the process proceeds to step 410. If it is determined to be included (if the user is determined to be the authorized user), the process proceeds to step 412.

At step 410, authentication server 170 executes a normal authentication process. By way of example, authentication server 170 searches the stored table of FIG. 4 for the corresponding authorized group. Specifically, authentication server 170 obtains the group in the cell identified by the device No. corresponding to the apparatus identifying information and the function corresponding to the function identifying information. Authentication server 170 determines, in the stored table of FIG. 5, whether the group corresponding to the obtained group includes the user ID obtained at step 404.

If it is included, authentication server 170 transmits a code (permission code) indicating permission to the image forming apparatus that has transmitted the authentication request. If it is not included, authentication server 170 transmits a code (inhibition code) indicating inhibition to the image forming apparatus that has transmitted the authentication request. If the permission code is received, the image forming apparatus executes the designated function, and if the inhibition code is received, the image forming apparatus does not execute the designated function but notifies the terminal that execution is impossible. Receiving the notice that execution is impossible, the terminal displays a message or indication to that effect.

At step 412, authentication server 170 executes the authentication process in case of a trouble. More specifically, if the designated image forming apparatus and the function are free of trouble, authentication server 170 transmits the permission code to the image forming apparatus that has transmitted the authentication request without making any determination of permission. The image forming apparatus receiving the permission code executes the instruction (see step 310).

If the designated image forming apparatus and the function have a trouble, authentication server 170 notifies that the designated function cannot be executed because of a trouble in the designated image forming apparatus and the function (trouble-occurred notice). When the image forming apparatus receives the trouble-occurred notice, it notifies the terminal of the contents. The terminal receiving the notice that execution is impossible displays a message or an indication to that effect. Thus, the user can recognize that the image forming apparatus he/she is permitted to use and generally uses is in trouble and the desired function cannot be executed. Accordingly, the user can issue an instruction to another image forming apparatus of which use is not usually permitted. As described above, regardless of the permission/inhibition, a prescribed function or functions can be executed by the image forming apparatus to which the instruction is newly given.

At step 414, authentication server 170 determines whether or not a trouble-solved notice is received from the troubled image forming apparatus. If the image forming apparatus transmits the trouble-solved notice at step 314, the notice is received by authentication server 170. If it is determined to be received, the process proceeds to step 416, and otherwise, the process proceeds to step 418.

At step 416, authentication server 170 sets the flag identified by the apparatus identifying information indicating the source of transmission and the trouble code included in the trouble-solved notice received at step 414 to "0".

At step 418, authentication server 170 determines whether or not an instruction to end has been given. If not, the process returns to step 400.

It is noted that step 410 is executed even if it is determined at step 408 that the user is not an authorized user. Therefore, if the user designates the image forming apparatus and the function having a trouble, for example, a notice is given that use is not permitted through the normal authentication process, without notifying that the designated function is unavailable because of a trouble, different from the process at step 412. Such an approach does not cause any problem in operating the system.

Figure 8:
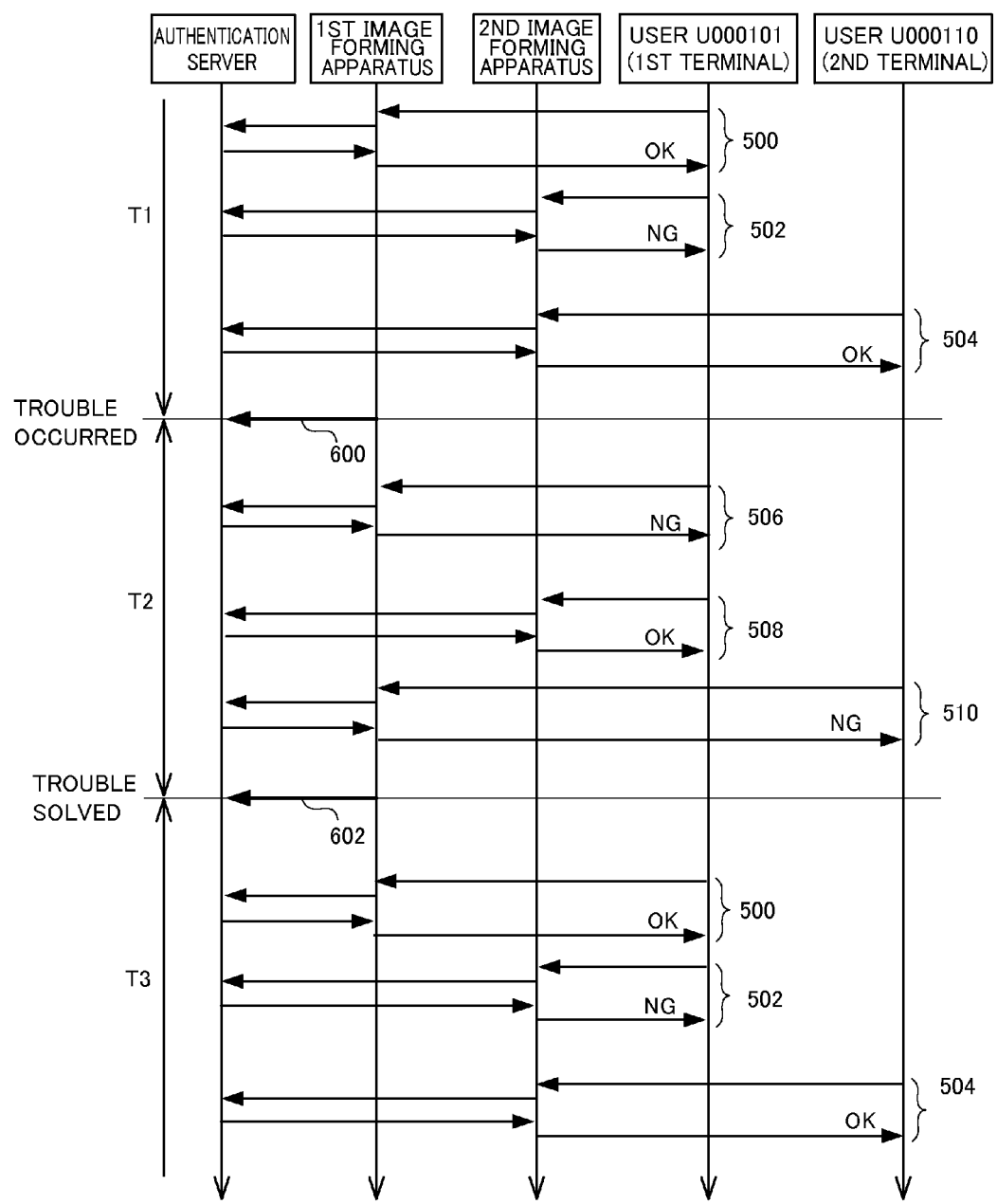
FIG. 8 is a sequence diagram showing communication between each of the authentication server, image forming apparatuses and terminals in the image forming system in accordance with an embodiment of the present invention.

Referring to FIG. 8, the operation of image forming system 200 will be specifically described. Here, an example will be described in which authentication server 170 manages the system in accordance with the tables of FIGS. 4 and 5, and users U000101 and U000110 (see portions in ellipses in FIG. 5) operate first and second terminals 180 and 182 to instruct color printing by first and second image forming apparatuses 100 and 160, respectively. In FIG. 8, the downward direction indicates the course of time.

In a trouble-free period T1, the print instruction is processed in the following manner.

For the print instruction indicated by 500, user U000101 sends a print instruction from first terminal 180 to first image forming apparatus 100, and in response, first image forming apparatus 100 transmits an authentication request to authentication server 170 (step 306). Receiving the authentication request, authentication server 170 executes the authentication process. Since this period is trouble-free, authentication server 170 executes process steps 406 and 410. From FIGS. 4 and 5, it can be seen that user U000101 belongs to the group G101 permitted to use the color printer function of first image forming apparatus 100. Therefore, authentication server 170 transmits the permission code to first image forming apparatus 100. Receiving the permission code, first image forming apparatus 100 executes color printing.

For the print instruction indicated by 502, user U000101 sends a print instruction from first terminal 180 to second image forming apparatus 160, and in response, second image forming apparatus 160 transmits an authentication request to authentication server 170 (step 306). Receiving the authentication request, authentication server 170 executes the authentication process. Since this period is trouble-free, authentication server 170 executes process steps 406 and 410. From FIGS. 4 and 5, it can be seen that user U000101 does not belong to group G102 permitted to use the color printer function of second image forming apparatus 160. Therefore, authentication server 170 transmits an inhibition code to second image forming apparatus 160. Receiving the inhibition code, second image forming apparatus 160 transmits a message that execution of the designated function is not permitted to first terminal 180, without executing color printing. First terminal 180 displays the received message.

For a print instruction indicated by 504, user U000110 sends a print instruction from second terminal 182 to second image forming apparatus 160, and in response, second image forming apparatus 160 transmits an authentication request to authentication server 170 (step 306). Receiving the authentication request, authentication server 170 executes the authentication process. Since this period is trouble-free, authentication server 170 executes process steps 406 and 410. From FIGS. 4 and 5, it can be seen that user U000110 belongs to group G102 permitted to use the color printer function of second image forming apparatus 160. Therefore, authentication server 170 transmits the permission code to second image forming apparatus 160. Receiving the permission code, second image forming apparatus 160 executes color printing.

In a time period T2 with a trouble occurred, the print instruction is processed in the following manner. Here, it is assumed that a trouble occurred in image forming unit 120 of first image forming apparatus 100 and a trouble-occurred notice 600 including a trouble code indicating the trouble in image forming unit 120 has been transmitted from first image forming apparatus 100 to authentication server 170 (step 302).

For a print instruction indicated by 506, user U000101 sends a print instruction from first terminal 180 to first image forming apparatus 100, and in response, first image forming apparatus 100 transmits an authentication request to authentication server 170 (step 306). Receiving the authentication request, authentication server 170 executes the authentication process. Since there is a trouble in this period, authentication server 170 executes process steps 406 to 412. From FIGS. 4 and 5, it can be seen that user U000101 belongs to group G101 permitted to use the color printer function of image forming apparatus 100 in which the trouble has occurred (YES at step 408). Since the instruction is related to the first image forming apparatus 100 and the color printer function having the trouble, authentication server 170 transmits the trouble-occurred notice to first image forming apparatus 100 (step 412). Receiving the trouble-occurred notice, first image forming apparatus 100 transmits the notice to first terminal 180. First terminal 180 displays the received trouble-occurred notice. Thus, user U000101 notes that color printing by first image forming apparatus 100, of which use is permitted, is impossible because of a trouble. Then, user U000101 gives a print instruction 508.

For print instruction indicated by 508, user U000101 sends a print instruction from first terminal 180 to second image forming apparatus 160, and in response, second image forming apparatus 160 transmits an authentication request to authentication server 170 (step 306). Receiving the authentication request, authentication server 170 executes the authentication process. Since there is a trouble in this period, authentication server 170 executes process steps 406 to 412. From FIGS. 4 and 5, it can be seen that user U000101 belongs to group G101 permitted to use the color printer function of image forming apparatus 100 in which the trouble has occurred (YES at step 408). Since the instruction is related to second image forming apparatus 160 and the color printer function free of any trouble, authentication server 170 transmits a permission code to second image forming apparatus 160 (step 412). Receiving the permission code, second image forming apparatus 160 executes color printing. Thus, user U000101 can obtain color-printed recording paper.

For a print instruction indicated by 510, user U000110 sends a print instruction from second terminal 182 to first image forming apparatus 100, and in response, first image forming apparatus 100 transmits an authentication request to authentication server 170 (step 306). Receiving the authentication request, authentication server 170 executes the authentication process. Since there is a trouble in this period, authentication server 170 executes process steps 406 to 412. From FIGS. 4 and 5, it can be seen that user U000110 does not belong to group G101 permitted to use the color printer function of first image forming apparatus 100 in which the trouble has occurred (NO at step 408). Therefore, authentication server 170 transmits an inhibition code to first image forming apparatus 100 (step 410). Receiving the inhibition code, first image forming apparatus 100 transmits a message that execution of the designated function is not allowed, to second terminal 182. Second terminal 182 displays the received message. Consequently, user U000110 recognizes that he/she has erroneously given an instruction of color printing to first image forming apparatus 100 of which use is not permitted. If user U000110 issues an instruction to color print to second image forming apparatus 160 of which use is permitted, he/she can have second image forming apparatus 160 execute color printing, as in the case of instruction 504.

Assume that after the occurrence of the trouble, the trouble was solved and, from first image forming apparatus 100, a trouble-solved notice 602 including the trouble code of the image forming unit has been transmitted to authentication server 170 (step 314). In the period T3 thereafter, a print instruction is processed in the same manner as in the trouble-free period T1.

As described above, if a trouble occurs in an image forming apparatus managed by authentication server 170, the user permitted to use the image forming apparatus can know the occurrence of the trouble. Therefore, if the user is notified beforehand that an image forming apparatus of which use is not permitted can be used in case of trouble, the user can immediately designate any other image forming apparatus and to instruct execution of a desired function.

For a user not influenced by the occurrence of a trouble, or a user not permitted to use the image forming apparatus having the trouble, normal authentication takes place. Therefore, unnecessary alarm of trouble occurrence can be avoided, without causing any problem.

In case of trouble, the user is permitted to use an image forming apparatus of which use is usually not permitted for the user, as an exception. Since this is an exceptional approach, the period to grant permission must be as set as short as possible. Therefore, it is desirable that the authentication server performs the normal authentication process when the job designated by the user is completed.

Alternatively, when the user, who is the object of authentication process in case of trouble and has logged-in to the image forming system from a terminal, logs-out, the authentication server may perform the normal authentication process.

When the trouble is solved, the authentication server performs the normal authentication process.

It is also possible to set conditions of jobs permitted in the authentication process in case of trouble, and to inhibit a job that does not satisfy the conditions. By way of example, an upper limit may be set for the number of sheets to be printed for a print job, and if the number exceeds the upper limit, execution may be inhibited even in the middle of a job.

In the foregoing, an example has been described in which, when a trouble occurs, the image forming apparatus notifies authentication server 170 of the occurrence of a trouble. The example, however, is not limiting. For instance, authentication server 170 may periodically inquire of each image forming apparatus whether there is any trouble by, for example, polling.

In the foregoing, an example has been described with reference to FIG. 6 in which even when a trouble occurred in relation to some functions, if there is an available function, the function is executed in accordance with an instruction. The example, however, is not limiting. When a trouble occurred in relation to some function or functions, even if there is an available function, such a function may not be executed. By way of example, after step 302, the control may be adapted to proceed to step 312 so that no instruction is received until the trouble is solved.

In the foregoing, an example has been described with reference to FIG. 8 in which when a trouble occurred in first image forming apparatus 100, user U000101 recognizing the trouble gives an instruction to second image forming apparatus 160. The designated function may be executed also by giving an instruction to the third or fourth image forming apparatus.

Though an example in which color printing is instructed has been described above, similar operation is executed when execution of other functions is instructed. For example, assume that a trouble occurred in image forming unit 120 of first image forming apparatus 100. In this situation, if user U000110 instructs monochrome printing by first image forming apparatus 100, a trouble-occurred notice is displayed on a terminal operated by user U000110. Therefore, user U000110 can recognize that the monochrome printing function of image forming apparatus 100, of which use is permitted for the user, cannot be used because of a trouble, and the user may issue an instruction to another image forming apparatus.

In the foregoing, an example has been described in which if a trouble occurred in any one of the image forming apparatuses and functions of which use is permitted for a specific user, the user is permitted to use an image forming apparatus of which use by the user is normally inhibited, even when the function can be executed by another image forming apparatus. The example, however, is not limiting. For instance, if the function of which execution is desired by a specific user is available in an image forming apparatus of which use by the user is permitted, normal authentication may be performed, and if there is no image forming apparatus allowing use of the function of which execution is desired by the specific user, the user may be permitted to use the image forming apparatus of which use is normally inhibited. By way of example, in FIG. 5, assuming that user U000101 also belongs to G102, user U000101 can also use image forming apparatus 160 and, therefore, even if a trouble occurs in first image forming apparatus 100, the third and fourth image forming apparatuses may be kept unusable by user U000101.

If a trouble occurs, the image forming apparatus of which use is temporarily permitted may be limited, among the image forming apparatuses of which use is usually inhibited. By way of example, if a trouble occurs in first image forming apparatus 100, user U000101 may use only the second image forming apparatus 160, use of some functions (monochrome printer function and monochrome scanner function) of which is normally permitted, while the user cannot use the third or fourth image forming apparatuses of which use is normally not permitted at all.

As described above, if a trouble occurs in any of a plurality of image forming apparatuses, which user is permitted to use which image forming apparatus may be determined appropriately in accordance with the policy of operating the image forming system.

Figure 9:
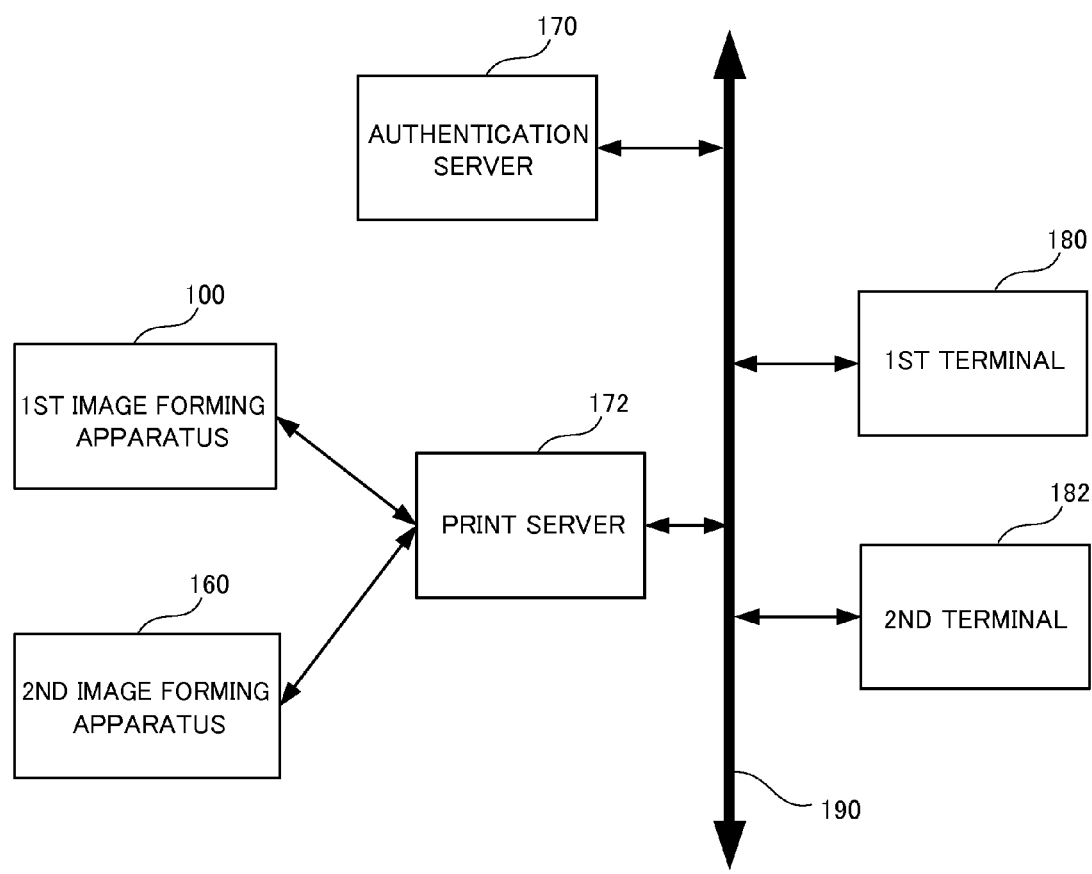
FIG. 9 is a block diagram showing a configuration of an image forming system different from that of FIG. 1.

The present invention is also applicable to a system including a print server 172 such as shown in FIG. 9. In such a system, a print instruction from each terminal is issued to the print server, and print data is stored as a job in the print server. Actual printing is executed by operating the operation unit of the image forming apparatus. At this time, printing can be done only by the image forming apparatus of which use is permitted. Specifically, the user cannot have the print unless he/she successfully pass the authentication process by authentication server 170 through the image forming apparatus and print server 172. The authentication is done when the user operates the operation unit of the image forming apparatus and enters the user ID, or when the user has an authentication card (a magnetic card or an IC card) read by a card reader. Therefore, if a trouble occurs in the image forming apparatus of which use is permitted for the user, printing becomes impossible. In this system also, by the same approach as described above, even if a trouble occurs in the image forming apparatus of which use is permitted for the user, the user can have the print by operating an image forming apparatus of which use by the user is normally not permitted. Authentication server 170 may execute the process shown in FIG. 7, and each image forming apparatus may execute the process shown in FIG. 6. The instruction at step 304 is an operation by the user of the operation unit of the image forming apparatus, and the notice to the terminal at step 310 is displayed on the operation unit of the image forming apparatus.

By way of example, when printing is to be done, the user operates operation unit 130 of first image forming apparatus 100 to enter the user ID and to designate a function to be used. Then, first image forming apparatus 100 transmits the user ID and the function identifying information of the designated function as well as the apparatus identifying information of first image forming apparatus 100 through print server 172 to authentication server 170. Using the received user ID, function identifying information and apparatus identifying information, authentication server 170 executes steps 404 to 412, for authentication. When authentication server 170 returns the result of authentication to the image forming apparatus that has transmitted the authentication request through print server 172, the image forming apparatus can execute a process in accordance with the result of authentication. Therefore, if a trouble occurs in first image forming apparatus 100 of which use by user U000101 is permitted and printing is impossible, for example, user U000101 may operate the operation unit of second image forming apparatus 160 of which use is normally inhibited, to execute printing.

In the system configuration shown in FIG. 1, authentication server 170 may also have the function of a print server.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An authentication server communicable with a terminal and a plurality of image forming apparatuses, wherein
said authentication server includes
a determining unit determining, in response to a request by a user requesting use of said image forming apparatus from said terminal, whether or not the user is permitted to use said image forming apparatus, on a user by user basis, and
a detecting unit detecting that said image forming apparatus is in a troubled state and cannot execute a prescribed function; and wherein
where said detecting unit detects that at least one of said plurality of image forming apparatuses is in the troubled state, in response to a user requesting an image forming apparatus not in the troubled state to execute a job utilizing a function of the image forming apparatus from said terminal, said determining unit permits execution of said job, if it is determined that the user is permitted to use said image forming apparatus in the troubled state.

2. The authentication server according to claim 1, further comprising:
a receiving unit receiving, from said image forming apparatus, in response to occurrence of a trouble in said image forming apparatus, apparatus identifying information for identifying the image forming apparatus and trouble identifying information for identifying a type of the occurred trouble to said authentication server;
said detecting unit detects the image forming apparatus in the troubled state and a function unusable because of the trouble, where said authentication server receives said apparatus identifying information and said trouble identifying information; and where said detecting unit detects that at least one of said plurality of image forming apparatuses is in the troubled state, in response to a user requesting an image forming apparatus not in the troubled state to execute a job utilizing a function of the image forming apparatus from said terminal, said determining unit permits execution of said job, if it is determined that the function utilized by said job corresponds to said function identified by said detecting unit and that said user is permitted to use said function unusable because of the trouble of said image forming apparatus in the troubled state.

3. The authentication server according to claim 1, wherein: where said detecting unit detects that at least one of said plurality of image forming apparatuses is in the troubled state, in response to a user requesting an image forming apparatus not in the troubled state to execute a job utilizing a function of the image forming apparatus from said terminal, said determining unit permits execution of said job, only if it is determined that the user is permitted to use only said image forming apparatus in the troubled state.

4. A method of controlling a plurality of image forming apparatuses by an authentication server communicable with a terminal and said plurality of image forming apparatuses, comprising the steps of:

in response to a user requesting use of said image forming apparatus from said terminal, said authentication server determining whether or not the user is permitted to use said image forming apparatus, on a user by user basis;

said authentication server detecting said image forming apparatus being in a troubled state and incapable of executing a prescribed function;

where at least one of said plurality of image forming apparatuses is in the troubled state, in response to a user requesting an image forming apparatus not in the troubled state to execute a job utilizing a function of the image forming apparatus from said terminal, said authentication server permitting execution of said job, if it is determined that the user is permitted to use said image forming apparatus in the troubled state.

5. The control method according to claim 4, further comprising the steps of:

said authentication server receiving, from said image forming apparatus, in response to occurrence of a trouble in said image forming apparatus, apparatus identifying information for identifying the image forming apparatus and trouble identifying information for identifying a type of the occurred trouble;

said authentication server identifying the image forming apparatus in the troubled state and a function unusable because of the trouble, by receiving said apparatus identifying information and said trouble identifying information; and where at least one of said plurality of image forming apparatuses is in the troubled state, in response to a user requesting an image forming apparatus not in the troubled state to execute a job utilizing a function of the image forming apparatus from said terminal, said authentication server permitting execution of said job, if it is determined that the function utilized by said job corresponds to said identified unusable function and that said user is permitted to use said function unusable because of the trouble of said image forming apparatus in the troubled state.

\* \* \* \* \*